United States Patent [19]

Kohli et al.

[11] Patent Number: 5,045,510

[45] Date of Patent: * Sep. 3, 1991

[54] PROCESS FOR PREPARING A SURFACE DARKENED GLASS

[75] Inventors: Jeffrey T. Kohli, Alfred; James E. Shelby, Alfred Station, both of N.Y.

[73] Assignee: Alfred University, Alfred, N.Y.

[*] Notice: The portion of the term of this patent subsequent to Jul. 31, 2007 has been disclaimed.

[21] Appl. No.: 557,913

[22] Filed: Jul. 25, 1990

Related U.S. Application Data

[63] Continuation-in-part of Ser. No. 431,633, Nov. 3, 1989, Pat. No. 4,944,784.

[51] Int. Cl.$^5$ .................. C03C 3/091; C03C 23/00; C03B 32/00
[52] U.S. Cl. ......................... 501/66; 501/13; 501/65; 65/30.11; 65/32.3; 313/534
[58] Field of Search ............... 65/30.11, 32.3, 61; 501/13, 65, 66; 313/534

[56] References Cited

U.S. PATENT DOCUMENTS

| | | | |
|---|---|---|---|
| 3,419,370 | 12/1968 | Cramer et al. | 65/30.11 |
| 3,449,103 | 6/1969 | Stookey | 65/30.11 |
| 3,689,242 | 9/1972 | Platakis et al. | 65/32.3 |
| 3,756,798 | 9/1973 | Ernsberger | 65/32.3 |
| 4,065,283 | 12/1977 | Asahara et al. | 65/61 |
| 4,130,680 | 12/1978 | Ference et al. | 65/30.11 |
| 4,240,836 | 12/1980 | Borrelli et al. | 501/13 |
| 4,475,059 | 10/1984 | Sink | 313/534 |
| 4,613,786 | 9/1986 | Holland et al. | 65/61 |

*Primary Examiner*—William R. Dixon, Jr.
*Assistant Examiner*—Anthony J. Green
*Attorney, Agent, or Firm*—Howard J. Greenwald

[57] ABSTRACT

A process for preparing a surface-darkened glass is disclosed. In the first step of this process, a specified silicate glass which contains a minor amount of antimony trioxide is provided. Thereafter, this glass is heated to a temperature of from about 350 to about 1,000 degrees Celsius while being contacted with hydrogen-containing gas. The presence of the antimony trioxide in the glass facilitates the darkening of its surface.

13 Claims, 2 Drawing Sheets

PROCESS FOR PREPARING A SURFACE DARKENED GLASS

CROSS-REFERENCE TO RELATED APPLICATION

This is a continuation-in-part application of applicants' copending patent application U.S. Ser. No. 07/431,633, filed Nov. 3, 1989, U.S. Pat. No. 4,944,784.

FIELD OF THE INVENTION

A process for darkening the surface of a glass composition in which a silicate glass containing antimony ion and less than 20 parts per million of silver ion or halide ion is contacted with a hydrogen-containing gas while being heated to a temperature of at least about 350 degrees Celsius.

BACKGROUND OF THE INVENTION

It is known that glasses whose surfaces are darkened may be used to prepare many different products. Thus, for example, a surface-darkened glass in the form of a disc may have its faces polished so that they transmit light through the visible region of the spectrum but have its perimeter substantially absorb such light. The lens so formed will absorb stray light near its perimeter but transmit such light near its center.

The prior art describes a process for the preparation of a surface-darkened glass in which a clear glass core is enveloped with a dark glass cladding and both are then subjected to heat and applied pressure to fuse them into a single unit. This prior art process often produces glass objects with imperfections at the interface of the core and the cladding; and, when the surface of such a glass object is polished, pitting and other imperfections often appear at the interface. These surface imperfections cause problems when one attempts to bond the surface to another surface.

It is an object of this invention to provide a process for the preparation of a surface-darkened glass which has substantially fewer surface imperfections and is substantially more uniform than prior art surface-darkened glass;

It is another object of this invention to provide a process for the preparation of surface-darkened glass which does not necessitate the joining of two different glass bodies;

It is yet another object of this invention to provide a process for the preparation of a surface-darkened glass with a relatively low amount of deformation;

It is yet another object of this invention to provide a relatively low-temperature process for the preparation of surface-darkened glass;

It is yet another object of this invention to provide a process for the preparation of surface-darkened glass in which the reaction time is relatively short; and It is yet another object of this invention to provide a surface-darkened glass object which contains at least about 40 weight percent of silica, elemental antimony, less than about 20 parts per million of halide ion, less than about 20 parts per million of silver ion, less than about 0.01 weight percent of iron, and less than about 0.01 weight percent of ferric ion.

SUMMARY OF THE INVENTION

In accordance with this invention, there is provided a process for preparing a glass object in which a specified silicate glass containing less than 20 parts (by weight) per million of silver ion, less than 10 parts (by weight) per million of halide ion, less than about 0.01 weight percent of elemental iron, and less than about 0.01 weight percent of iron ions, is heated to a temperature of at least about 350 degrees Celsius while being contacted with hydrogen-containing gas.

BRIEF DESCRIPTION OF THE DRAWINGS

The present invention will be more fully understood by reference to the following detailed description thereof, when read in conjunction with the attached drawings, wherein like reference numerals refer to like elements, and wherein.

DESCRIPTION OF THE PREFERRED EMBODIMENTS

Figure 1:
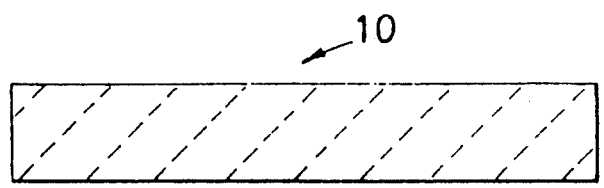
FIG. 1 is a transparent glass blank which may be used to prepare a window by a preferred process of the invention.

The process of applicants' invention produces a darkened glass, that is, a glass with one or more darkened regions whose optical absorbance throughout the ultraviolet, visible, and near-infrared regions of light spectrum is substantially higher than glass regions not treated by the process.

The glass produced by the process of this invention may be used to collimate light and produce treated apertures for cameras and scopes for night vision applications, for example.

The process of this invention may be used with silicate glasses. As used in this specification, the term silicate glass refers to a glass composition which contains less than about 20 parts per million of silver ion, less than about 20 parts per million of halide ion, and at least about 40 weight percent of silica.

In the first step of the process of this invention, from about 0.1 to about 10 weight percent of antimony ion (by weight of antimony trioxide) is incorporated into a silicate glass. The antimony ion is preferably selected from the group consisting of trivalent antimony ion, pentavalent antimony ion, and mixtures thereof. However, as will be apparent to those skilled in the art, other antimony compounds also may be used.

In general, the antimony ion is incorporated into the glass by adding an antimony compound, such as antimony trioxide, to either the glass batch and/or the glass melt. When the antimony compound used is not antimony trioxide, the amounts added should be adjusted so that, on an equivalent basis, from about 0.1 to about 10 weight percent of antimony trioxide is added. In determining how much of other antimony compound(s) must be added to be equivalent to a specified amount of antimony trioxide, one may calculate the number of antimony ions per cubic centimeter furnished by the antimony trioxide and then use an amount of the other antimony compound(s) which will furnish the same concentration antimony ions.

It is to be understood that, once the glass batch has been melted, antimony is not present in the glass in the form of antimony compound but is present as antimony ion. Thus, when reference is made to a glass containing from about 0.1 to about 10 weight percent of antimony ion, it will be understood that such glass contains a sufficient amount of antimony ion to correspond to the 0.1 to 10 weight percent of antimony trioxide compound present in the batch and/or added to the melt.

Although it is preferred to add the antimony ions in the form of antimony trioxide, one may also use other antimony compounds which decompose during the melting process into antimony ions. Thus, for example, one may use antimony pentoxide, antimony tetraoxide, antimony sulfates, antimony sulfides, and the like.

The antimony compound(s) may be mixed with the glass-forming ingredients in a normal batching procedure. Alternatively, or additionally, some or all of the antimony compound(s) may be added to the glass melt. When the batch is melted to form the glass, the antimony compound usually decomposes into a mixture of trivalent and pentavalent antimony ions, which are incorporated into the glass. When the glass is heated in the presence of a hydrogen-containing gas, the antimony ion in the glass is reduced to elemental antimony.

The antimony compound present in the glass melt acts as a fining agent, removing entrained bubbles from the melt. Although arsenic oxide also act as a fining agent, it is perceived to be substantially more toxic than antimony compounds and thus is less acceptable to those in the industry, especially when the glass is to be subjected to additional processing steps which may release the arsenic material from it.

Heat tends to cause the decomposition of antimony oxide into antimony and oxygen ions, and the antimony ion so formed is usually a mixture of trivalent and pentavalent antimony. The amount of pentavalent antimony formed will vary with factors such as the melting atmosphere (which generally is air), the composition of the glass used, the melting temperature, and the cooling rate.

The concentration of the antimony ion in the glass may be determined by conventional means such as, e.g., wet chemical analysis, energy dispersive spectroscopy (EDS), and the like. Thus, for example, one may use a scanning electron microscope such as, e.g., the "Autoscan Scanning Electron Microscope," serial number 52, manufactured by the ETEC Corporation, 3392 Investment Boulevard, Hayward, Calif. The measurements may be made in accordance with the "Autoscan Scanning Electron Microscope Operation and Maintenance Manual" furnished with such device, the disclosure of which is hereby incorporated by reference into this specification.

Elemental analysis of the glass may be conducted with a "PCT System 4 Plus" (or "Imagist 4000") apparatus (model 4000C, serial number 808) manufactured by Princeton Gamma-Tech (PGY) of Princeton, N.J.

It is preferred to incorporate as much antimony ion as possible into the glass. However, the amount of antimony compound which may be added is limited by the solubility of the antimony compound in the melt.

When the antimony compound is added to the batch, it is preferred that substantially all of its particles be from about 0.5 to about 5.0 microns in size. It is also preferred that the other components of the batch have all of their particles be from about 0.5 to about 10 microns in size. The batch components should be thoroughly mixed so that a homogeneous batch is produced.

When the antimony compound is added during the glass melting, it also should have substantially all of its particles be from about 0.5 to about 5.0 microns in largest dimension. The antimony compound should be thoroughly mixed in the melt so that a homogeneous melt results.

The glass composition used in the process of this invention does not contain any appreciable amount of silver ion. In general, it contains from about 0 to about 20 parts per million of silver ion and, in one preferred embodiment, less than about 10 parts per million of silver ion.

The glass composition used in the process of this invention does not contain any appreciable amount of halide ion. As used in this specification, the term halide ion refers to ions selected from the group consisting of fluoride, chlorine, bromine, and iodine ion, or mixtures thereof. In general, the glass composition contains from about 0 to about 20 parts per million of halide ion and, in one preferred embodiment, contains less than about 10 parts per million of such halide ion.

Without wishing to be bound to any particular theory, applicants believe that the presence of substantial amounts of silver and/or halide ion in the glass will cause a reaction to occur which will compete with the desired darkening reaction.

It is also preferred that the glass composition contain less than about 0.01 weight percent of elemental iron and/or iron ions. Such iron and/or iron ions also cause reactions which compete with the darkening reaction to occur.

As indicated above, the glass composition used in the process of this invention is a silicate glass, i.e., a glass which contains at least about 40 weight percent (and preferably from about 40 to about 85 weight percent) of silica. See, for example, column 1 of U.S. Pat. Nos. 3,306,833, 3,892,582, 3,920,909, 3,920,463, 4,001,019, 4,043,781, 4,118,214, 4,240,836, 4,390,635, and 4,608,349, the disclosures of which are hereby incorporated by reference into this specification. This silicate glass composition is comprised of from about 0.1 to about 10 weight percent of antimony ion (by weight of antimony trioxide).

In one preferred embodiment, the glass composition is comprised of at least about 50 weight percent of silica, from about 0.1 to about 5.0 weight percent of alumina, from about and 0.1 to about 10 weight percent of antimony trioxide, from about 0.1 to about 25 weight percent of boron trioxide, and from about 0.1 to about 15.0 weight percent of alkali.

In one preferred embodiment, the glass composition is comprised of at least about 50 weight percent of silica, from about 0.1 to about 5.0 weight percent of alumina, from about 0.1 to about 10 weight percent of antimony trioxide, from about 0.1 to about 25 weight percent of boron trioxide, from about 0.1 to about 15.0 weight percent of alkali, and from about 0.1 to about 5.0 weight percent of alkaline earth oxide.

Boron ion is preferably incorporated into the glass by adding a boron compound, such as boron trioxide, to the glass batch or the melt. When boron trioxide is used, from about 0.1 to about 25 weight percent of it is added to the batch and/or the melt. After the glass formation, when the boron is present in the glass in the form of boron ion, the amount of boron ion which corresponds to the boron trioxide added to the batch or melt may be determined. When other boron compounds are used, equivalent concentrations of them which will give the same concentration of boron ion in the glass should be used.

With the exception of the antimony trioxide (which is converted to elemental antimony after reduction with hydrogen), each of the other components in the glass batch or melt are present in the glass as ionic species. For each of these other components, when a concentration is specified of an oxide form of the component, it is to be understood that one also may use equivalent amounts of other compounds which will yield the same concentration of cations in the glass.

It is preferred to add the boron ions to the batch or the glass melt in the form of boron trioxide. Alternatively, or additionally, one may utilize other boron compounds such as boric acid.

From about 0.1 to about 15.0 weight percent of alkali may be added to the glass batch or the melt. The alkali is preferably selected from the group consisting of lithia, sodium oxide, potassium oxide, rubidium oxide, cesia, and the like.

When alkaline earth oxide is used, it is preferred that said oxide be selected from the group consisting of magnesium oxide, calcium oxide, strontium oxide, barium oxide, and mixtures thereof.

In one preferred embodiment, the glass composition is comprised of from about 60 to about 75 weight percent of silica, from about 1 to about 5 weight percent of alumina, from about 0.1 to about 25 weight percent of boron oxide, from about 0.1 to about 10 weight percent of antimony trioxide, and from about 0.1 to about 15 weight percent of a mixture of alkali metal oxides selected from the group consisting of lithia, soda, and potassia.

Hydrogen-treatment of the glass composition

The glass composition described above is subjected to a hydrogen treatment at elevated temperature. The glass may be contacted with hydrogen-containing gas while it is being heated in a closed vessel. Alternatively, hydrogen-containing gas may be flowed over the glass while it is being heated in a closed vessel. In this latter embodiment, it is preferred to use a flow rate of from about 0.25 to about 10 liters per minute.

The hydrogen-containing gas used may be, e.g., pure hydrogen, forming gas (a mixture of hydrogen and nitrogen), and the like. It is preferred to use substantially pure hydrogen as the hydrogen-containing gas.

In general, the glass is heated to a temperature of from about 350 to about 1,000 degrees Celsius while being contacted with hydrogen-containing gas. In one embodiment, where the glass treated is an alkali alumino-borosilicate glass, the glass is heated to a temperature of from about 400 to about 600 degrees Celsius.

It is preferred to heat the glass to the specified temperature while contacting it with the hydrogen-containing gas for at least about 30 minutes. In one embodiment, the glass is subjected to these conditions for from about 0.5 to about 40 hours. When said alkali alumino-borosilicate glass is used in the process, the treatment time is generally from about 2 to about 30 hours.

The hydrogen-containing gas treatment may be conducted under subatmospheric pressure, atmospheric pressure, or superatmoshperic pressure. In one embodiment, the glass is subjected to a pressure of from about 100 to about 5,000,000 Torr and, more preferably, from about 200 to about 1,000 Torr. In the most preferred aspect of this embodiment, a pressure of from about 700 to about 800 Torr is used.

FIGS. 1 through 5 illustrate how an aperture may be made with the process of this invention.

Referring to FIG. 1, a clear glass blank 10 comprised of alkali alumino-borosilicate glass is provided. This glass is preferably similar to the borosilicate glasses of the 7,000 series sold by Corning, Inc. of Corning, N.Y., but, instead of containing 0.5 weight percent of arsenic trioxide, it contains from about 0.5 to about 1.0 weight percent of antimony trioxide. The properties of the Corning 7000 Series glasses are well known to those skilled in the art and are described, e.g., on pages 1-10 to 2-2 of George W. McLellan et al.'s "Glass Engineering Handbook," Third Edition (McGraw-Hill Book Company, New York, 1984).

Figure 2:
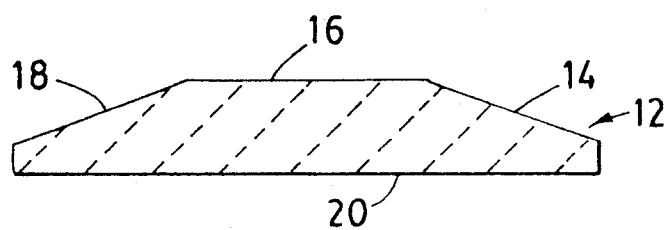
FIG. 2 is a machine-ground object produced from the glass blank of FIG. 1.

Referring to FIG. 2, the glass blank 10 is ground with a bonded grinding wheel to form the wedge-shaped object of FIG. 2, which is comprised of side surface 12, tapered surface 14, top surface 16, tapered surface 18, and bottom surface 20. The blank may be ground by any of the grinding techniques known to those skilled in the art; see, e.g., page 9-3 of said McLellan book.

Figure 3:
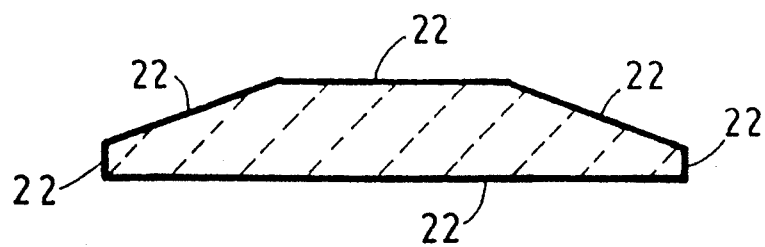
FIG. 3 is a surface-darkened glass object produced from the machine-ground object of FIG. 2.

The ground blank of FIG. 2 is then contacted with hydrogen gas at a flow rate of 3 liters per minute while it is heated to a temperature of 580 degrees Celsius for about 10 hours. The surface-darkened glass object of FIG. 3 is produced. The object of FIG. 3 contains darkened surface 22, which is at least 10 microns thick. The darkened surface of the glass is comprised of from about 0.1 to about 10 weight percent, by weight of darkened surface, of elemental antimony.

The thickness of darkened surface 22 will vary with the treatment temperature, the treatment time, the gas pressure, and the amount of hydrogen in the gas. In general, the thickness of darkened surface 22 will range from about 10 to about 300 microns.

Figure 4:
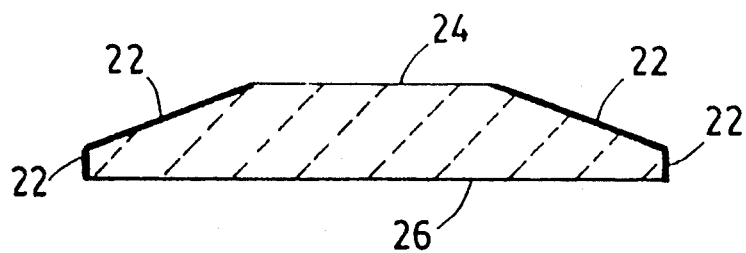
FIG. 4 is a reground glass object produced from the surface-darkened object of FIG. 3.

Referring to FIG. 4, the surface-darkened glass of FIG. 3 is ground on its top and bottom surface to produce new top surface 24 and bottom surface 26. During this grinding operation, minute particles of ground glass, antimony, and other materials will be produced. The ground antimony is believed to be substantially less toxic than other glass-darkening materials which might have been used, such as arsenic.

The ground surfaces 24 and 26 tend to transmit light impinging upon them, whereas the remaining surfaces 22 tend to absorb it. The aperture of FIG. 4 may be used to collimate light. It should be understood that the article of FIG. 4 is thinner than the article of FIG. 3 inasmuch as a portion of the top and bottom surface have been ground away.

Figure 5:
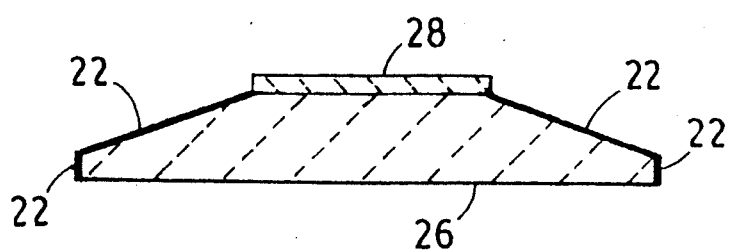
FIG. 5 is an aperture to which a gallium arsenide wafer has been bonded.

FIG. 5 illustrates a preferred embodiment in which a gallium arsenide wafer 28 is bonded to surface 24 of FIG. 4. The assembly of FIG. 5 may be used in a night-vision viewing device.

In one embodiment, the glass article produced by the process of this invention preferably consists of an integral glass article with at least one optical interface but no mechanical interface. The absorbance characteristics of this glass article may be determined in accordance with the procedure illustrated in FIGS. 6 and 7.

Figure 6:
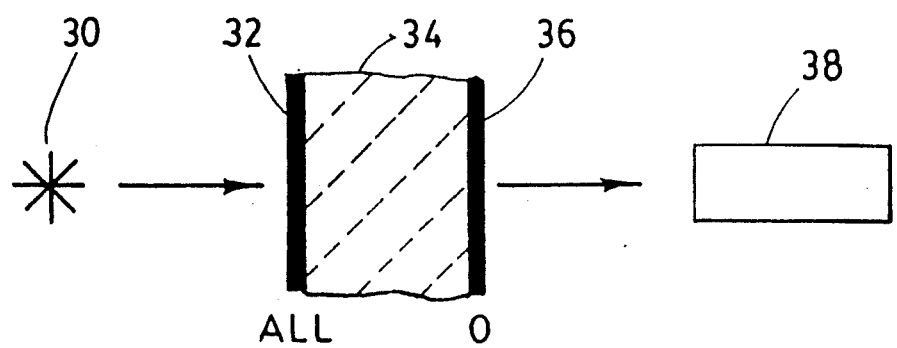
FIG. 6 is a schematic of a means for determining the absorbance characteristics of one surface-darkened article.

Referring to FIG. 6, a light source 30 is directed upon a surface darkened region of glass object 34. The light passing through darkened region 36 of object 34 is then measured by detector 38.

The absorbance of the object 34 (absorbance per unit sample length) is measured for object 34. A portion of darkened region 32 is then ground away, and the absorbance of the remaining object 34 is then also determined. The absorbance characteristics of the object can then be plotted as a function of width, as shown in FIG. 7.

Figure 7:
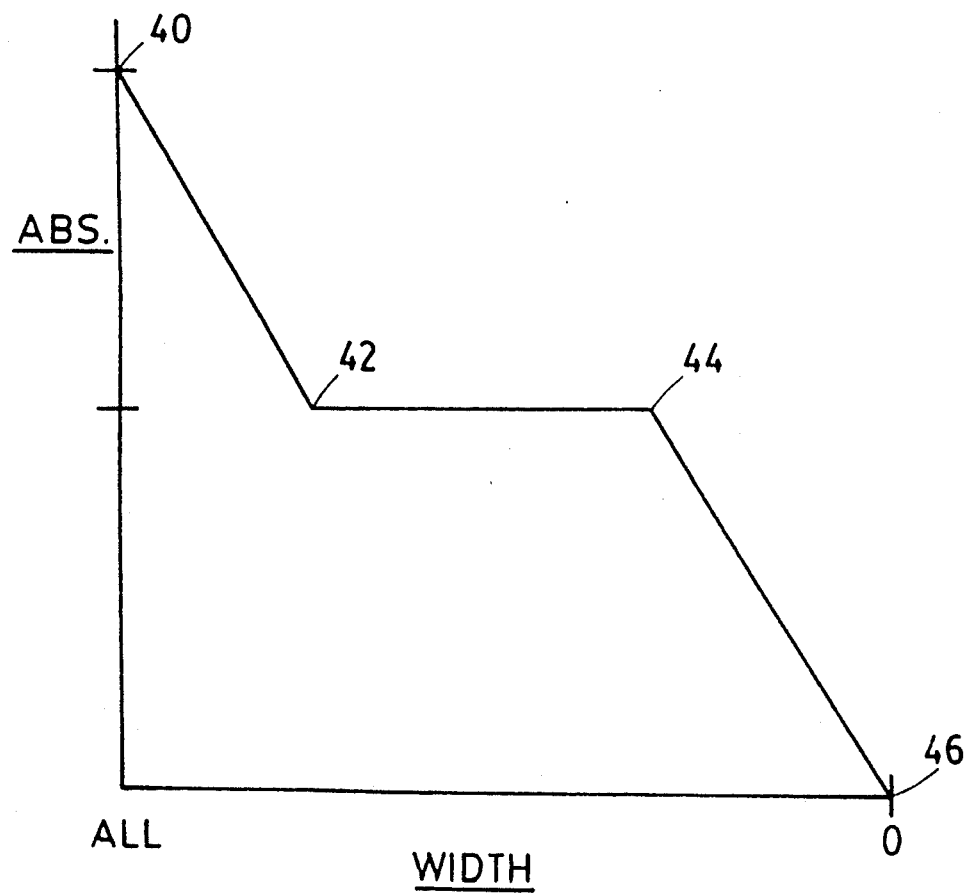
FIG. 7 is a plot of the absorbance per thickness of the article of FIG. 6.

Referring to FIG. 7, the absorbance of object 34 decreases from point 40 (at which point no grinding had occurred) to point 42 (at which point the entire darkened region 32 had been ground away). From point 42 until point 44 had been ground away). From point 42 until point 44 (at which point the entire undarkened region 34 had been ground away), the absorbance was substantially constant. From point 44 to point 46 (at which point the entire darkened region 36 had been ground away), the absorbance decreases.

The glass article produced by the process of this invention has non-linear absorbance. The term non-linear absorbance, as used in this specification, refers to the plot of absorbance versus article width (as shown in FIG. 7) when a glass article has its absorbance measured with light impinging upon a darkened surface of the article (as shown in FIG. 6), and the glass article is then periodically ground and its absorbance remeasured until it has substantially zero width (as shown in FIGS. 6 and 7). The plot of absorbance versus width, when one goes from 100 percent width to substantially zero width, will be nonlinear, and thus the article has a non-linear absorbance.

The glass article of this invention has at least one darkened region whose absorbance is not a function of the intensity of the light impinging upon it. This article is substantially different from photosensitive glasses, whose absorptive characteristics change with light intensity.

Use of the process of the invention with commercial glasses

Those skilled in the art will readily appreciate that many commercial glasses may advantageously be modified by incorporating antimony compound therein to improve the rate of surface darkening.

Thus, by way of illustration and not limitation, one may modify the commercial glasses disclosed in Corning Incorporated's catalog MB-EG-90 entitled "Specialty Glass and Glass Ceramic Materials" (Materials Business, Corning Incorporated, Main Plant 21-3, Corning, N.Y. 14831, 1990), the disclosure of which is hereby incorporated by reference into this specification.

By way of illustration, one may modify Corning Incorporated's glass number 0211 by incorporating antimony ion into it. This glass is an alkali zinc borosilicate, and it is described on page 12.1 of the Corning catalog.

By way of further illustration, one may modify Corning Incorporated's glass number 0330 by incorporating antimony ion into it. This material is a glass-ceramic, and it is described in an article by David C. Boyd and David A. Thompson entitled "Glass" which appeared at pages 807-880 of Kirk_Othmer's "Encyclopedia of Chemical Technology," Volume 11, Third Edition (John Wiley & Sons, Inc., New York, 1980), the disclosure of which is hereby incorporated by reference into this specification.

By way of further illustration, one may modify Corning Incorporated's glasses 2405 and/or 3320 by incorporating antimony ion into it. These glasses are borosilicates, and they are described in the Kirk-Othmer article.

By way of further illustration, one may modify each of Corning Incorporated's glass number 7040 (soda potash), 7050 (soda borosilicate), 7052 (alkali barium borosilicate), 7056 (alkali borosilicate), 7070 (lithia potash borosilicate), 7251 (soda borosilicate), 7720 (soda lead borosilicate), 7740 ("borosilicate, PYREX"), 7761 (potash borosilicate), and the like, by incorporating from about 0.1 to about 10 weight percent of antimony ion into the glass in order to improve its surface darkening properties. Each of these glasses is described on page 12.1 of the aforementioned Corning catalog.

The following Examples are presented to illustrate the claimed invention but are not to be deemed limitative thereof. Unless otherwise stated, all parts are by weight, and all temperatures are in degrees Celsius.

EXAMPLES 1

The reagents used in this experiment, and in the other experiments of the Examples, were obtained from the Fisher Scientific Company of Pittsburgh, Pa. and are described in, e.g., the Fisher '88 catalog. The silica used in these examples was "silica, granular, fine", reagent number S150-3, page 198C. The boron oxide used was boric acid, reagent number A74-500, page 45C. The alumina used was reagent number A591-500, page 25C. The potassium carbonate used was regent number P208-500, page 182C. The lithium carbonate used was reagent number L119-500, page 137C. The sodium carbonate used was reagent number S263-500, page 203C. The antimony trioxide used was reagent number A860-500, page 34C. The arsenic trioxide used was reagent number A860-500, page 35C.

6.8 grams of silica, 0.3 grams of alumina, 3.197 grams of boric acid ($H_3BO_3$), 0.247 grams of lithium carbonate, 0.171 grams of sodium carbonate, 1.32 grams of potassium carbonate, and 0.05 grams of antimony trioxide were charged into a mortar and pestle and hand mixed for about 2 minutes. The mixture was then charged into a platinum crucible which was then placed into a preheated furnace (a bottom-loading Lindberg Hi-Temperature Crucible Furnace, model number 56724, Lindberg Company, Watertown, Wisc.) which had been preheated to a temperature of 1,500 degrees Celsius. The batch was then melted in the furnace by subjecting it to said temperature of 1,500 degrees Celsius for 30 minutes. Thereafter the glass melt was removed from the furnace and allowed to cool in air to ambient temperature, broken up into cullet, ground in a mortar and pestle, put back into the crucible, and melted in the furnace for an additional 15 minutes. Thereafter the glass melt was removed from the furnace and allowed to cool in air to ambient temperature.

The cooled glass was removed from the crucible and annealed. The glass was charged to an annealing furnace (Fisher Isotemp Programmable Ashing Furnace, model number 497, Fisher Scientific, Pittsburgh, Pa.) and placed upon a refractory brick support in such furnace. The temperature of the annealing furnace was then raised from ambient to a temperature of 595 degrees Celsius over a period of about 150 minutes. Once the sample was at a temperature of 595 degrees Celsius, it was maintained at this temperature for 20 minutes. Thereafter, the glass was then cooled to 400 degrees Celsius at a rate of 1 degree Celsius per minute. After the sample had reached 400 degrees Celsius, it was cooled to ambient at a rate of 20 degrees Celsius per minute.

Four substantially rectangular slabs of about 1 centimeter×2 centimeters×1 millimeter size were cut from annealed sample on a low-speed diamond saw (Buehler Isomet Low Speed Saw, model #11-1180, Buehler Limited, Lake Bluff, Ill.). Each of these samples was separately placed into a vitreous silica tube 20 inches long×1.5 inches in diameter which was equipped with a gas inlet, a vacuum line, a gas outlet, and a thermocouple. Once the sample was inserted into the silica tube, air was evacuated from the tube, the tube was filled with hydrogen, a pressure of 700 millimeters of mercury was imposed within the tube, and the tube was then inserted into a preheated tube furnace at a temperature of 580 degrees Celsius and thereafter heated at 580 degrees Celsius while being subjected to the pressure of 700 millimeters of mercury and contacted with hydrogen for specified periods of time.

In the experiment of Example 1, the sample was heated at 580 degrees Celsius for 2 hours. In the experiment of Example 2, the sample was then heated at 580 degrees Celsius for 6 hours. In the experiment of Example 3, the sample was then heated at 580 degrees Celsius for 14 hours. In the experiment of Example 4, the sample was then heated at 580 degrees Celsius for 28 hours.

After being heated for the specified period of time, the silica tube was then removed from the tube furnace, and the silica tube was then allowed to cool in air to ambient; cooling occurred over a period of from about 5 to about 10 minutes. The cooled sample was then removed from the silica tube; it was observed to have undergone substantial darkening. The optical absorbances of two darkened surfaces of each cooled sample were measured on a Varian ultra-violet visible near I.R. spectrophotometer (Varian UV-Vis-NIR Spectrophotometer, 2300 Series, Varian Instruments, Palo Alto, Calif.); the measurements were conducted in accordance with Publication Number 87-175-111, Revision A682, available from Varian Instruments.

The optical absorbance of each cooled sample is shown below. Tables 1, 2, 3, and 4 show the optical absorbances of the samples produced in the experiments of Examples 1, 2, 3, and 4, respectively.

COMPARATIVE EXAMPLES 5-8

The procedure of Examples 1-4 was followed, with the exception that 0.05 grams of arsenic trioxide were used in place of the 0.05 grams of antimony trioxide used in Examples 1-4.

In the experiment of Example 5, the sample was heated at 580 degrees Celsius for 2 hours. In the experiment of Example 6, the sample was then heated at 580 degrees Celsius for 6 hours. In the experiment of Example 7, the sample was then heated at 580 degrees Celsius for 14 hours. In the experiment of Example 8, the sample was then heated at 580 degrees Celsius for 28 hours.

The optical absorbance for each of the cooled samples obtained in these experiments is shown below. Tables 1, 2, 3, and 4 show the optical absorbances of the samples produced in the experiments of Examples 5, 6, 7, and 8, respectively.

TABLE 1

| 2 HOURS AT 700 TORR, 580 CELSIUS | | |
|---|---|---|
| | ABSORBANCE | |
| WAVELENGTH (nanometers) | 0.5 WEIGHT PERCENT Sb | 0.5 WEIGHT PERCENT As |
| 800 | 0.227(Ex. 1) | 0.070(Ex. 5) |
| 600 | 0.391(Ex. 1) | 0.141(Ex. 5) |
| 400 | 0.969(Ex. 1) | 0.477(Ex. 5) |
| 300 | 2.73(Ex. 1) | 1.60(Ex. 5) |

TABLE 2

| 6 HOURS AT 700 TORR, 580 CELSIUS | | |
|---|---|---|
| | ABSORBANCE | |
| WAVELENGTH (nanometers) | 0.5 WEIGHT PERCENT Sb | 0.5 WEIGHT PERCENT As |
| 800 | 0.336(Ex. 2) | 0.086(Ex. 6) |
| 600 | 0.600(Ex. 2) | 0.226(Ex. 6) |
| 400 | 1.750(Ex. 2) | 0.906(Ex. 6) |
| 300 | >4.00(Ex. 2) | 2.59(Ex. 6) |

TABLE 3

| 14 HOURS AT 700 TORR, 580 CELSIUS | | |
|---|---|---|
| | ABSORBANCE | |
| WAVELENGTH (nanometers) | 0.5 WEIGHT PERCENT Sb | 0.5 WEIGHT PERCENT As |
| 800 | 0.547(Ex. 3) | 0.102(Ex. 7) |
| 600 | 0.961(Ex. 3) | 0.336(Ex. 7) |
| 400 | 2.930(Ex. 3) | 1.440(Ex. 7) |
| 300 | >4.00(Ex. 3) | 3.76(Ex. 7) |

TABLE 4

| 28 HOURS AT 700 TORR, 580 CELSIUS | | |
|---|---|---|
| | ABSORBANCE | |
| WAVELENGTH (nanometers) | 0.5 WEIGHT PERCENT Sb | 0.5 WEIGHT PERCENT As |
| 800 | 0.727(Ex. 4) | 0.138(Ex. 8) |
| 600 | 0.1.34(Ex. 4) | 0.430(Ex. 8) |
| 400 | >4.00(Ex. 4) | 2.08(Ex. 8) |
| 300 | >4.00(Ex. 4) | >4.00(Ex. 8) |

It is to be understood that the aforementioned description is illustrative only and that changes can be made in the apparatus, the ingredients and their proportions, and in the sequence of combinations and process steps as well as in other aspects of the invention discussed herein without departing from the scope of the invention as defined in the following claims.

Thus, by way of illustration, one may prepare surface-darkened simple alkali silicate glasses, and/or surface-darkened alumino-silicate glasses, and/or surface-darkened soda-lime glasses by the process of this invention by using glass compositions with comparable amounts of antimony trioxide in them and contacting them with hydrogen-containing gas and heat in a similar manner.

We claim:
1. A process for preparing a surface-darkened glass, comprising the steps of sequentially:
(a) providing a glass composition comprised of at least about 40 weight percent of silica, from about 0.1 to about 10 weight percent of antimony ion, less than about 20 parts per million of halide ion, less than about 20 parts per million of silver ion, less than about 0.01 weight percent of iron, and less than about 0.01 weight percent of ferric ion; and

(b) subjecting said glass composition to a temperature of from about 350 to about 1,000 degrees Celsius for at least about 30 minutes while contacting said glass composition with hydrogen-containing gas.

2. The process as recited in claim 1, wherein said glass composition is comprised of from about 0.1 to about 25 weight percent of boron.

3. The process as recited in claim 2, wherein said glass composition is comprised of from about 0.1 to about 5.0 weight percent of alumina.

4. The process as recited in claim 3, wherein said glass composition is comprised of from about 0.1 to about 15.0 weight percent of alkali.

5. The process as recited in claim 4, wherein said alkali is a mixture of alkali metal oxides selected from the group consisting of the oxides of lithium, sodium, and potassium.

6. The process as recited in claim 1, wherein said hydrogen-containing gas is hydrogen.

7. The process as recited in claim 4, wherein from about 0.25 to about 10 liters of hydrogen per minute is flowed over said glass composition while said glass composition is heated at said temperature of from about 350 to about 1,000 degrees Celsius.

8. The process as recited in claim 7, wherein said glass is contacted with said hydrogen and heated to a temperature of from about 400 to about 600 degrees Celsius for at least about 2 hours.

9. The process as recited in claim 4, wherein said glass is heated to said temperature of from about 350 to about 1,000 degrees Celsius while being contacted with said hydrogen-containing gas and being subjected to subatmospheric pressure.

10. The process as recited in claim 4, wherein said glass is heated to said temperature of from about 350 to about 1,000 degrees Celsius while being contacted with said hydrogen-containing gas and being subjected to atmospheric pressure.

11. The process as recited in claim 4, wherein said glass is heated to said temperature of from about 350 to about 1,000 degrees Celsius while being contacted with said hydrogen-containing gas and being subjected to superatmospheric pressure.

12. The process as recited in claim 4, wherein said glass is heated to said temperature of from about 350 to about 1,000 degrees Celsius while being contacted with said hydrogen-containing gas and being subjected to a pressure of from about 200 to about 1,000 Torr.

13. The process as recited in claim 4, wherein said glass is heated to said temperature of from about 350 to about 1,000 degrees Celsius while being contacted with said hydrogen-containing gas and being subjected to a pressure of from about 700 to about 800 Torr.

* * * * *